US012527510B2

(12) United States Patent
Tokura et al.

(10) Patent No.: US 12,527,510 B2
(45) Date of Patent: Jan. 20, 2026

(54) WEARABLE ENVIRONMENTAL SENSOR DEVICE

(71) Applicant: NTT, Inc., Tokyo (JP)

(72) Inventors: Akio Tokura, Tokyo (JP); Kei Kuwabara, Tokyo (JP); Takako Ishihara, Tokyo (JP)

(73) Assignee: NTT, INC., Tokyo (JP)

( * ) Notice: Subject to any disclaimer, the term of this patent is extended or adjusted under 35 U.S.C. 154(b) by 588 days.

(21) Appl. No.: 17/785,654

(22) PCT Filed: Dec. 19, 2019

(86) PCT No.: PCT/JP2019/049951
§ 371 (c)(1),
(2) Date: Jun. 15, 2022

(87) PCT Pub. No.: WO2021/124529
PCT Pub. Date: Jun. 24, 2021

(65) Prior Publication Data
US 2023/0059323 A1    Feb. 23, 2023

(51) Int. Cl.
*A61B 5/332* (2021.01)
*G01K 1/08* (2021.01)
(Continued)

(52) U.S. Cl.
CPC .............. *A61B 5/332* (2021.01); *G01K 1/08* (2013.01); *G01K 1/14* (2013.01); *G01W 1/11* (2013.01)

(58) Field of Classification Search
CPC . A61B 5/332; G01K 1/08; G01K 1/14; G01K 1/11
See application file for complete search history.

(56) References Cited

U.S. PATENT DOCUMENTS 4,525,770 A * 6/1985 Perretta .................... H05K 7/20
361/399
4,593,813 A * 6/1986 Powel .................... B65D 73/02
206/328
(Continued)

FOREIGN PATENT DOCUMENTS

CN      105444912 A  *  3/2016  ........... A61B 5/0008
GB       2460430 A  * 12/2009  ......... A41D 19/0027
(Continued)

OTHER PUBLICATIONS

17785654_Dec. 9, 2024_JP_2014044126_A_H.pdf,Mar. 13, 2014.*
(Continued)

*Primary Examiner* — John E Breene
(74) *Attorney, Agent, or Firm* — Slater Matsil, LLP (57) ABSTRACT

A wearable environmental sensor includes an environmental sensor arranged on a wall surface of a housing including a sealed section, the wall being in contact with an environment, and a protective structure formed around the environmental sensor, wherein the protective structure includes a plurality of ventilating holes, a sensor surface of the environmental sensor is arranged to face an opening of at least one of the ventilating holes, and an attaching part for attaching the environmental sensor to the wall surface comes into contact only with an edge of a sensor substrate of the environmental sensor and with a portion of a back face of the sensor substrate.

24 Claims, 12 Drawing Sheets

(51) Int. Cl.
*G01K 1/14* (2021.01)
*G01W 1/11* (2006.01)

(56) References Cited

U.S. PATENT DOCUMENTS

| | | | | |
|---|---|---|---|---|
| 4,687,886 | A * | 8/1987 | Pistor | H01H 19/00 |
| | | | | 200/6 B |
| 5,397,856 | A * | 3/1995 | Lee | H02G 3/08 |
| | | | | 174/52.1 |
| 6,264,187 | B1 * | 7/2001 | Hertz et al. | B25B 1/24 |
| | | | | 269/266 |
| 2002/0009119 | A1 * | 1/2002 | Matthew | G01N 33/0009 |
| | | | | 374/45 |
| 2005/0001728 | A1 * | 1/2005 | Appelt | G08B 21/182 |
| | | | | 600/300 |
| 2005/0245839 | A1 * | 11/2005 | Stivoric | A61B 10/0012 |
| | | | | 374/E1.004 |
| 2008/0074254 | A1 * | 3/2008 | Townsend | G01W 1/17 |
| | | | | 340/572.1 |
| 2009/0149722 | A1 * | 6/2009 | Abolfathi | G16H 10/65 |
| | | | | 381/94.1 |
| 2012/0032380 | A1 * | 2/2012 | Riachentsev | B25B 11/00 |
| | | | | 269/8 |
| 2013/0211204 | A1 * | 8/2013 | Caduff et al. | A61B 5/6831 |
| 2014/0275824 | A1 * | 9/2014 | Couse | G16H 40/60 |
| | | | | 600/301 |
| 2015/0004544 | A1 * | 1/2015 | Namai | G03F 7/038 |
| | | | | 546/203 |
| 2016/0051191 | A1 * | 2/2016 | Miller | A61B 5/681 |
| | | | | 600/300 |
| 2022/0349758 | A1 * | 11/2022 | Tokura et al. | G01K 1/08 |
| 2023/0104773 | A1 * | 4/2023 | Gurin | A61B 5/01 |
| | | | | 600/549 |

FOREIGN PATENT DOCUMENTS

| | | | | |
|---|---|---|---|---|
| JP | 52110664 A | | 9/1977 | |
| JP | 2002318216 A | | 10/2002 | |
| JP | 2014044126 A | * | 3/2014 | |
| WO | WO2008087959 A1 | * | 5/2010 | |
| WO | WO-2019073843 A1 | * | 4/2019 | A42B 3/30 |
| WO | WO-2021090436 A1 | * | 5/2021 | G01L 1/024 |

OTHER PUBLICATIONS

17785654_Dec. 9, 2024_JP_WO2008087959_A1_H.pdf, May 6, 2010.*
17785654_Dec. 9, 2024_WO_2019073843_A1_H.pdf, Apr. 18, 2019.*
17785654_Dec. 9, 2024_WO_2021090436_A1_H.pdf, May 14, 2021.*
17785654_Dec. 9, 2024_CN_105444912_A_H.pdf, Mar. 30, 2016.*
17785654_Dec. 9, 2024_GB_2460430_A_H.pdf, Dec. 2, 2009.*
Kwon, J. et al., "Evaluation of the Wet Bulb Globe Temperature (WBGT) Index for Digital Fashion Application in Outdoor Environments," JESK, Jan. 5, 2017, 14 pages.

* cited by examiner

WEARABLE ENVIRONMENTAL SENSOR DEVICE

CROSS-REFERENCE TO RELATED APPLICATIONS

This patent application is a national phase filing under section 371 of PCT application no. PCT/JP2019/049951, filed on Dec. 19, 2019, which application is incorporated herein by reference in its entirety.

TECHNICAL FIELD

The present invention relates to a wearable environmental sensor device for measuring environmental information in the vicinity of a location where the device is worn, and in particular to a wearable environmental sensor device that is worn on clothing, a human body, or the like to measure information regarding the environment inside clothing of a wearer.

BACKGROUND

It is important to monitor environmental information for physical condition management, such as prevention of heat stroke in hot weather. For example, heat index meters conventionally used to prevent heat stroke measure black-bulb temperature, wet-bulb temperature, and dry-bulb temperature to obtain a heat index, and a method is used in which the heat index is used as a guide of behavior; e.g., avoiding going out or doing strenuous work when the heat index is relatively high (see NPL 1).

A conventional heat index meter generally consists of a relatively large device, and it is difficult to place the device in any given location. For example, the heat index released by the Ministry of the Environment is a value that represents a wide area.

However, the actual heat load received by each individual is greatly influenced by the local environment. For example, the environment varies greatly depending on where each person is, such as outdoors or indoors, in the sun or in the shade, or on the grass or on the concrete. In addition, even in the same location, the influence of radiation from the ground, for example, is greatly different between a tall adult and a short child. Moreover, the environment of the human body also varies greatly depending on the clothing worn, the state of movement, the state of perspiration, and so on.

CITATION LIST

Non Patent Literature

[NPL 1] JuYoun Kwon, Ken Parsons, Evaluation of the Wet Bulb Globe Temperature (WBGT) Index for Digital Fashion Application in Outdoor Environments, Journal_Ergon_Soc_Korea 36 (2017) 23-36.

SUMMARY

Technical Problem

A method of carrying and wearing an environmental sensor is conceivable to monitor the environment in a desired place, particularly in the vicinity of a human body, but conventional WBGT meters or environmental sensors are too large in size to wear and inconvenient to carry, and there may be restrictions on the location where the sensor is worn. Moreover, a small wearable environmental sensor device has not been known that can be attached onto an individual's clothing or to the inside thereof and measure the environment in the immediate vicinity of the individual's clothing or the environment within the clothing.

In addition, since the space for arranging a sensor element is limited due to the miniaturization of the environmental sensor, thermal insulation between the sensor element and a housing cannot be ensured depending on the manner of attaching the sensor element, and there is a problem that heat transmitted from the housing to the sensor element makes it difficult to accurately measure the surrounding environment.

There is also a problem that sweat or the like inside clothing is attached to the sensor surface, resulting in a high humidity value being measured, for example.

An object of embodiments of the present invention is to measure the environment in the vicinity of a human body or the like accurately, easily, and stably.

Means for Solving the Problem

To solve the foregoing problems, a wearable environmental sensor device according to embodiments of the present invention includes: an environmental sensor arranged on a wall surface of a housing including a sealed section, the wall being in contact with an environment; and a protective structure formed around the environmental sensor, wherein the protective structure includes a plurality of ventilating holes, a sensor surface of the environmental sensor is arranged to face an opening of at least one of the ventilating holes, and an attaching part for attaching the environmental sensor to the wall surface comes into contact only with an edge of a sensor substrate of the environmental sensor and with a portion of a back face of the sensor substrate.

Effects of Embodiments of the Invention

With the wearable environmental sensor device according to embodiments of the present invention, temperature, humidity, and environmental information can be measured accurately, easily, and stably.

DETAILED DESCRIPTION OF ILLUSTRATIVE EMBODIMENTS

First Embodiment

Hereinafter, a wearable environmental sensor device (hereinafter referred to as an "environmental sensor device") 100 according to the first embodiment of the present invention will be described with reference to FIGS. 1A to 5.

Figure 1A:
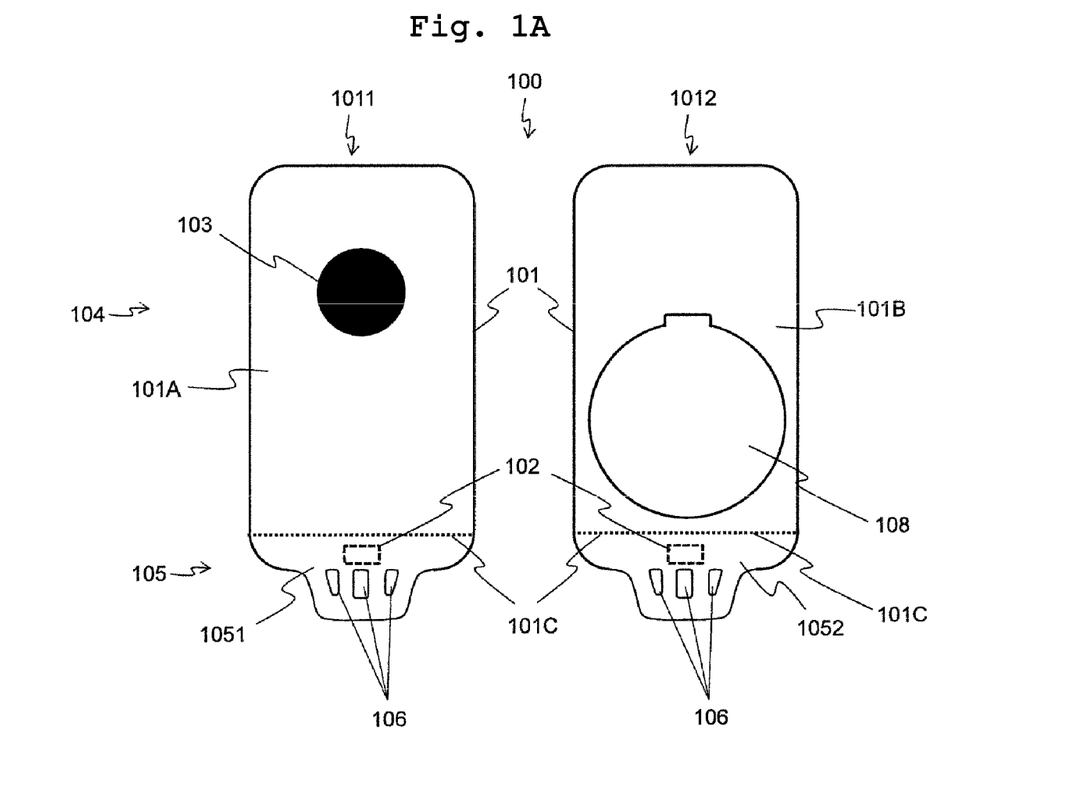
FIG. 1A is an external view of front and back faces of a wearable environmental sensor device according to a first embodiment of the present invention.
Figure 1B:
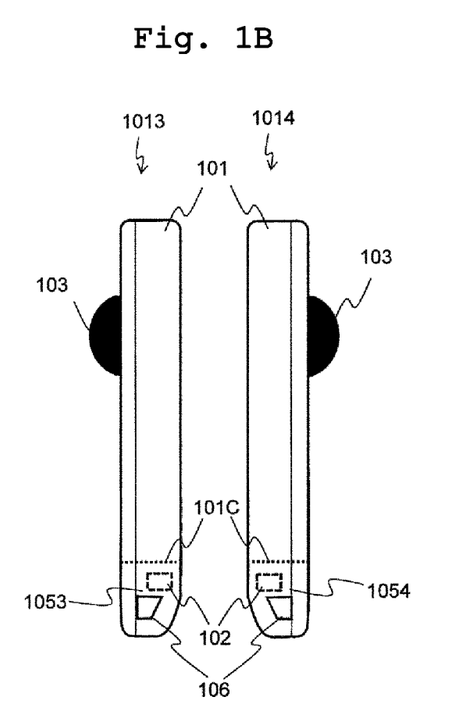
FIG. 1B is an external view of side faces of the wearable environmental sensor device according to the first embodiment of the present invention.
Figure 1C:
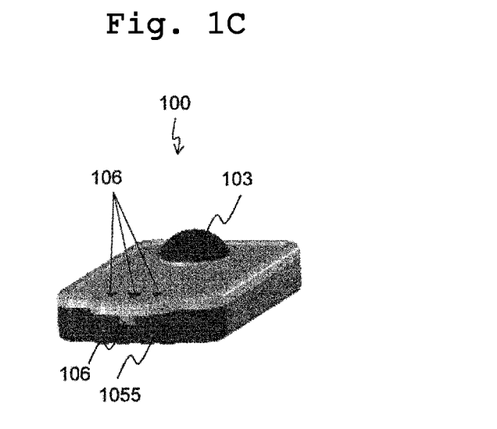
FIG. 1C is a perspective view of the wearable environmental sensor device according to the first embodiment of the present invention.

FIGS. 1A to 1C show external views of the environmental sensor device 100 according to the present embodiment. FIG. 1A is an external view of a front side 1011 and a back side 1012 of the environmental sensor device 100. FIG. 1B is an external view of a right side face 1013 and a left side face 1014. FIG. 1C is a perspective view.

The environmental sensor device 100 has, in a housing 101, a temperature and humidity sensor 102 capable of measuring air temperature and relative humidity, and has, on a front face 101A of the housing 101, a black-bulb temperature sensor 103 for measuring black-bulb temperature. A lid 108 for battery replacement is provided in a back face 101B of the housing 101.

The environmental sensor device 100 includes a sealed section 104 and a protective structure (unsealed section) 105. The sealed section 104 is sealed, and the sealed section 104 and the protective structure (unsealed section) 105 are separated by a housing wall 101C within the housing 101.

The size of the environmental sensor device 100 is about 50 mm in length, about 24 mm in width, and about 7 mm in thickness.

The temperature and humidity sensor 102 is mounted on a substrate (hereinafter referred to as "sensor substrate") 1021, and the surface of the temperature and humidity sensor 102 on the side on which the temperature and humidity sensor 102 is mounted on the sensor substrate 1021 is referred to as a "sensor surface" 1022. The temperature and humidity sensor 102 is arranged within the protective structure (unsealed section) 105, and is covered by the protective structure (unsealed section) for protecting the temperature and humidity sensor 102. The protective structure (unsealed section) has a function of preventing the temperature and humidity sensor 102 from colliding with an external object and being damaged, and preventing a human finger or the like from coming into contact with the surface (sensor surface 1022) of the temperature and humidity sensor 102 and making the sensor surface (sensor surface 1022) dirty.

The protective structure (unsealed section) 105 is provided with ventilating holes 106. The ventilating holes, which have openings in a front face 1051, a back face 1052, a right side face 1053, a left side face 1054, and a lower end face 1055 of the protective structure (unsealed section) 105, penetrate so that each of all the openings is connected to the other openings. As a result, outside air favorably flows in through the ventilating holes, and thus the temperature and humidity sensor 102 can come into contact with the outside air and measure temperature and humidity of the surrounding air.

Although a configuration in which each of all the openings are connected to the other openings has been described here, alternatively, some of the openings may be connected to the other openings, and any configuration may be employed as long as outside air favorably flows in through the ventilating holes.

Although the description has been given of a configuration in which the openings are provided in the front face 1051, the back face 1052, the right side face 1053, the left side face 1054, and the lower end face 1055 of the protective structure (unsealed section), the openings need only be provided in some of these faces, rather than all of the faces, and any configuration may be employed as long as outside air favorably flows in through the ventilating holes.

The temperature and humidity sensor 102 is arranged such that the sensor surface 1022 faces the opening in the lower end face 1055. Accordingly, a structure in which the sensor surface 1022 is easily exposed to airflow is formed. Here, although the temperature and humidity sensor 102 is arranged such that the sensor surface 1022 faces the opening in the lower end face 1055, the sensor surface 1022 may face the opening in any face other than the lower end face 1055, and the temperature and humidity sensor 102 need only be arranged such that the sensor surface 1022 faces at least one of the openings.

The protective structure 105 also includes the openings of the ventilating holes 106 that oppose the left and right side faces 1013 and 1014, and the temperature and humidity sensor 102 is arranged above upper ends of the openings of the ventilating holes 106 (on the sealed section side). Thus, a structure is formed in which changes in temperature and humidity due to ventilation can be perceived and that is not exposed to water droplets coming from sweat or the like. Accordingly, it is possible to suppress a degradation of measurement accuracy of the temperature and humidity sensor 102 due to water droplets being attached to the sensor surface 1022 and adverse effects such as a humidity value being observed higher than the actual humidity value.

It is desirable that the housing 101 is lightweight since it is wearable. It is also desirable that the housing 101 has low heat conduction such that heat is not transferred between the black-bulb temperature sensor 103, the housing 101, and the temperature and humidity sensor 102. For this reason, it is desirable that the material of the black bulb and the housing 101 is synthetic resin such as plastic, except for a region where metal needs to be used.

In the black-bulb temperature sensor 103, the black bulb is formed of a synthetic resin such as plastic for weight reduction, and is firmly bonded to the housing 101 by means of welding using ultrasound or the like, for example. The black bulb and the housing 101 are sealed by means of welding to form a dustproof and waterproof structure.

It is desirable that the black bulb is matte black and has an average emissivity of 0.95.

The black bulb is hollow inside, and a temperature sensor, such as a thermistor or a semiconductor temperature sensor, is inserted into the hollow portion to measure black-bulb temperature. The measured value may be corrected as required. In the present embodiment, the diameter of the black bulb is 10 mm, for example.

Only the battery lid 108 for inserting a button battery is provided in the back face of the housing 101 of the environmental sensor device 100 according to the present embodiment, and the environmental sensor device 100 can be worn by putting it into a pocket of clothing while operating the environmental sensor device 100 using a commercially available button battery.

As another mode, for example, a snap button, a clip, or the like may be provided on the back face of the housing 101 to attach the environmental sensor device 100 to clothing or the like.

Figure 2:
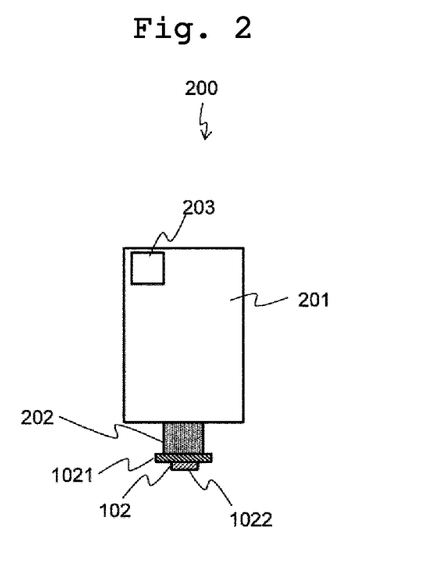
FIG. 2 is a diagram showing a configuration of a mounting substrate of the wearable environmental sensor device according to the first embodiment of the present invention.

FIG. 2 shows a mounting substrate 200 within the housing 101 of the environmental sensor device 100. The mounting substrate 200 includes a rigid substrate 201 on which a CPU (not shown) and an electronic circuit (not shown) for processing measurement data, and a wireless communication device (wireless communication chip) 203 for transmitting data to an external device are mounted, the sensor substrate 1021 on which the temperature and humidity sensor 102 is mounted, a flexible substrate 202, and a battery (not shown) for operating the temperature and humidity sensor 102. Of these parts, the rigid substrate 201 and the battery (not shown) for operating the temperature and humidity sensor 102 are arranged in the sealed section 104, and water, sweat, rain, or the like is prevented from entering from the outside.

The sealing structure of the sealed section 104 may be constituted by a packing using an O ring or the like, and a screw or the like. If the housing 101 is formed of synthetic resin such as plastic, the sealing structure of the sealed section 104 may be formed by means of welding using ultrasound or the like, or may be formed of an adhesive.

Meanwhile, the sensor substrate 1021 on which the temperature and humidity sensor 102 is mounted is arranged within the protective structure (unsealed section) 105. The temperature and humidity sensor 102 is a sensor for measuring air temperature and relative humidity in the vicinity, is constituted by a semiconductor chip, for example, and includes a temperature sensor in which the resistance varies depending on temperature and a humidity sensor that absorbs moisture of surrounding gas and in which the capacity and resistance vary.

The temperature and humidity sensor 102 includes an AD conversion circuit, and the measured temperature and humidity are transmitted as digital data to the CPU in the sealed section 104. The sensor substrate 1021 of the temperature and humidity sensor 102 is entirely protected by a chemically inactive coating (coating agent) to form a dustproof and waterproof structure. Note that the temperature and humidity sensor 102 itself is also dustproof and waterproof.

The temperature and humidity sensor 102 on the sensor substrate 1021 arranged in the protective structure (unsealed section) 105 and the CPU on the rigid substrate 201 arranged in the sealed section 104 are electrically connected to each other via the flexible substrate 202. The flexible substrate 202 is arranged between the sealed section 104 and the protective structure (unsealed section) 105 such that the sealing property of the sealed section 104 can be maintained by the packing using an O ring or the like, and the screw or the like, at the periphery of the housing wall 101C. In the arrangement of the flexible substrate 202 at the housing wall 101C between the sealed section 104 and the protective structure (unsealed section) 105, for example, these parts may alternatively be adhered to each other without gaps using an adhesion, in addition to the aforementioned packing using an O ring or the like, and the screw or the like, and thus dustproof and waterproof properties can be ensured.

As described above, the environmental sensor device 100 according to the present embodiment has a configuration in which the temperature and humidity sensor 102 that requires contact with outside air is arranged outside the sealed section (i.e., within the protective structure (unsealed section) 105), the rigid substrate 201 on which the CPU, the electronic circuit, and so on for processing signals (digital data) obtained by the temperature and humidity sensor 102 are mounted is arranged in the sealed section 104 to ensure dustproof and waterproof properties, and the temperature and humidity sensor 102 within the protective structure (unsealed section) 105 and the rigid substrate 201 in the sealed section 104 are connected by the flexible substrate 202. This configuration enables the temperature and humidity sensor 102 to come into contact with outside air and detect temperature and humidity with high sensitivity, and makes it possible to stably process the detected information (digital data) using the electronic circuit arranged in a sealed environment with excellent dustproof and waterproof properties.

Figure 3:
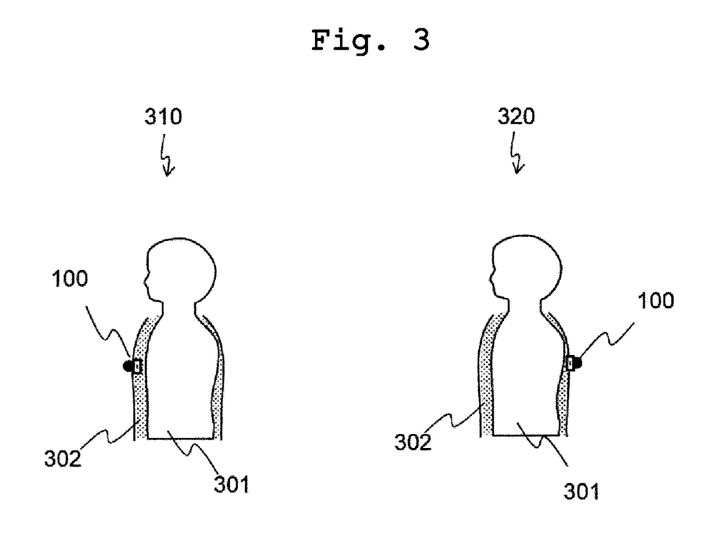
FIG. 3 is a diagram showing examples of wearing the wearable environmental sensor device according to the first embodiment of the present invention.

FIG. 3 shows examples in which the environmental sensor device wo is attached to outerwear and thus worn and used. The outerwear 302 has a pocket, and the housing 101 of the environmental sensor device wo is inserted into the pocket with the black bulb facing outward. For example, the environmental sensor device wo may be worn at the chest position as in a wearing form 310, or may be worn at the back position as in a wearing form 320. If a pocket is provided, it is desirable that the material of the pocket is a highly moisture-permeable material such as a mesh fabric, in order to improve the response to humidity.

According to the above mode, it is possible to easily wear the environmental sensor device wo at the same time as wearing clothing such as a T-shirt or a polo shirt, and measure environmental information such as temperature and humidity in the vicinity of a human body 301 without disturbing the wearer's movement.

It is also possible to easily remove the environmental sensor device wo when measurement is not performed, and wash the clothing.

As other attaching methods, the environmental sensor device 100 may be attached via a snap button, or a structure such as a clip may be formed on the housing 101 of the environmental sensor device 100 to wear the device by clipping the device onto clothing.

With the environmental sensor device 100 according to the present embodiment, the environment in the vicinity of a human body can be measured by measuring the influence of solar radiation on the human body using the black-bulb temperature sensor 103, and measuring temperature inside clothing and humidity inside clothing using the temperature and humidity sensor 102.

Although the present embodiment has described an example of measuring temperature and humidity inside clothing, the environmental sensor device can also be attached to the outside of outerwear and used as an external environmental sensor device attached to the immediate outside of a human body.

Figure 4A:
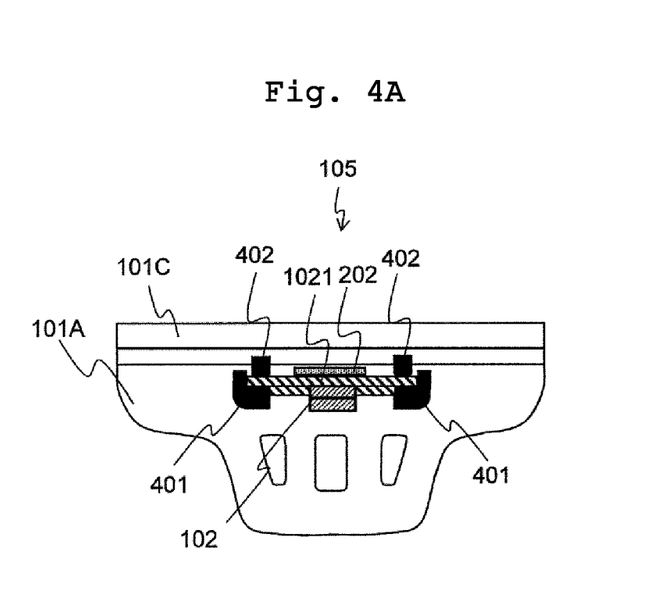
FIG. 4A is a perspective view showing the inside of a protective structure (unsealed section) of the wearable environmental sensor device according to the first embodiment of the present invention, viewed from the back side.
Figure 4B:
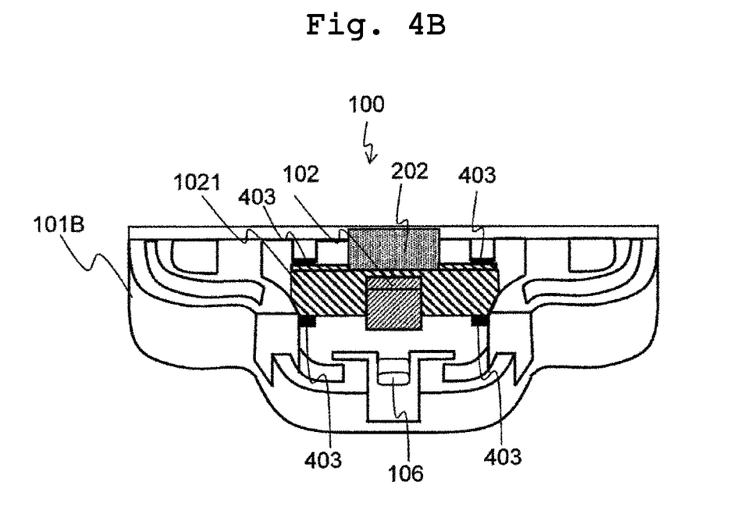
FIG. 4B is a perspective view showing the inside of a protective structure (unsealed section) of the wearable environmental sensor device according to the first embodiment of the present invention, viewed from the front side.
Figure 4C:
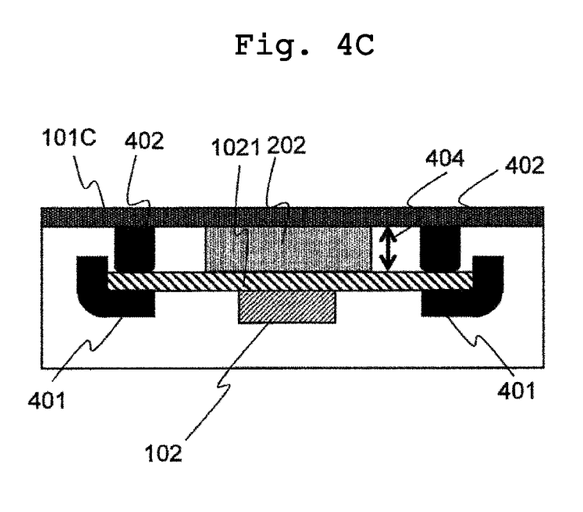
FIG. 4C is a cross-sectional view showing the inside of a protective structure (unsealed section) of the wearable environmental sensor device according to the first embodiment of the present invention.

FIGS. 4A, 4B, and 4C are diagrams illustrating the state where the temperature and humidity sensor 102 is attached to the housing 101 within the protective structure (unsealed section) 105. FIG. 4A is a perspective view of the substrate (sensor substrate) 1021 with the temperature and humidity sensor 102 mounted thereon, viewed from the back side. FIG. 4B is a perspective view of the sensor substrate 1021 viewed from the front side. FIG. 4C is a cross-sectional view of an area where the temperature and humidity sensor 102 is attached to the housing 101.

As shown in FIGS. 4A, 4B, and 4C, the housing 101 has, on the front face 101A, a housing wall 101C that is in contact with the environment, and has attaching pails, namely L-shaped parts 401 and protruding parts 402 on an inner wall of the front face 101A. The sensor substrate 1021 on which the temperature and humidity sensor 102 is mounted is arranged while being sandwiched or attached between the L-shaped parts 401 and the protruding parts 402. As a result, the sensor substrate 1021 comes into contact with the L-shaped parts 401 at side faces, which are end faces of the sensor substrate 1021, and at both edges of the sensor substrate 1021. Further, the sensor substrate 1021 comes into contact with leading ends of the protruding parts 402 at portions of a back face at both edges of the sensor substrate 1021.

Attaching contact portions 403 are portions at which the aforementioned attaching parts abut against the sensor substrate 1021.

According to the above configuration, the contact area between the sensor substrate 1021 and the attaching parts, namely the L-shaped parts 401 and the protruding parts 402, can be reduced, and the sensor substrate 1021 can be arranged at a position away from the housing 101.

Furthermore, since an air layer can be formed between the back face of the sensor substrate 1021 and the housing 101, it is possible to suppress heat conduction from the housing 101 and accurately measure local temperature and humidity. Air has thermal insulation that is about 7 times higher than that of ordinary plastic (synthetic resin), which is the material of the housing 101, and about 2.5 times higher than that of a thermal insulator. Accordingly, it is possible to realize higher thermal insulation than that of a thermal insulation structure formed by increasing the thickness of the housing 101 or inserting a thermal insulator.

According to the present embodiment, thermal insulation can be improved and the sensor substrate 1021 can be easily attached to the housing 101 by the structure in which the sensor substrate 1021 is sandwiched or inserted, at the edges thereof, between the L-shaped parts 401 and the protruding parts 402.

As mentioned above, the back face of the sensor substrate 1021 comes into contact only with the protruding parts 402, between both edges of the sensor substrate 1021 and the housing 101. In this configuration, a distance 404 between the back face of the sensor substrate 1021 and the housing 101 is determined by the shape of the protruding parts 402. Since a thermal insulator with a thickness of about 0.5 mm or more is effective in the thermal insulating effect, it is desirable that the distance 404 between the back face of the sensor substrate 1021 and the housing 101, i.e., the thickness of the air layer, is 0.2 mm or more, considering that air has high thermal insulation that is about 2.5 times that of the thermal insulator. Further, considering the size of the environmental sensor device 100, it is desirable that the distance 404 between the back face of the sensor substrate 1021 and the housing 101 is 20 mm or less.

Variations of First Embodiment

Next, variations of the first embodiment will be described. These variations have substantially the same configuration as the first embodiment, but are different in the mode of contact between the temperature and humidity sensor substrate 1021 and the protruding parts 402 when the temperature and humidity sensor substrate 1021 is attached to the housing 101 in the environmental sensor device 100.

Figure 5A:
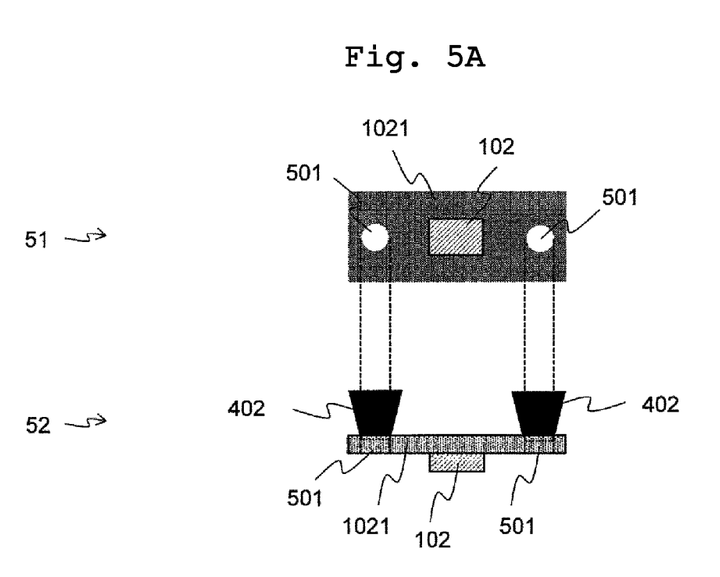
FIG. 5A is a diagram showing contact between protruding parts and a sensor substrate having guide holes in a wearable environmental sensor device according to a variation of the first embodiment of the present invention.
Figure 5B:
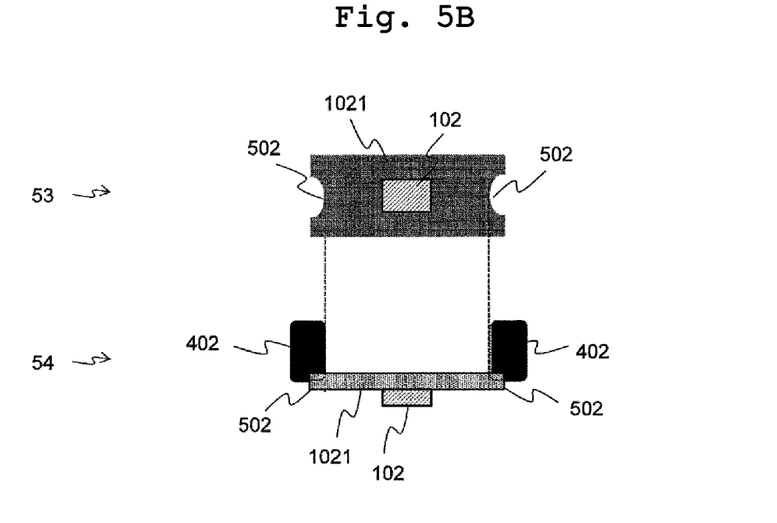
FIG. 5B is a diagram showing contact between protruding parts and a sensor substrate having cutout portions in a wearable environmental sensor device according to a variation of the first embodiment of the present invention.

FIGS. 5A and 5B show modes in which the environmental sensor device 100 according to the present variations comes into contact with the protruding parts 402 via guides provided in the temperature and humidity sensor substrate 1021. Guide holes 501 and cutout portions 502 are provided as the guides.

In FIG. 5A, 51 denotes an upper face of the temperature and humidity sensor substrate 1021, and 52 denotes a side face thereof. The guide holes 501 are provided in the sensor substrate 1021, and the protruding parts 402 are inserted into the sensor substrate 1021 via the guide holes 501.

Here, although each protruding part 402 has a tapered structure that is thinner at a leading end thereof so as to be able to be easily inserted into the corresponding guide hole 501, any structure other than the tapered structure may be employed as long as the protruding part 402 can be inserted into the guide hole 501.

Although the cross-sectional shape of the guide holes 501 and the protruding parts 402 is a circular shape, the cross-sectional shape of the guide holes 501 and the protruding parts 402 may be any other shape, such as a square shape, a rectangular shape, a polygonal shape, or an elliptical shape, as long as the guide holes 501 and the protruding parts 402 have corresponding shapes and sizes, and the protruding parts 402 can be inserted into the guide holes 501.

In FIG. 5B, 53 denotes an upper face of the temperature and humidity sensor substrate 1021, and 54 denotes a side face thereof. The cutout portions 502 are provided in the sensor substrate 1021, and the protruding parts 402 are fitted to the sensor substrate 1021 via the cutout portions 502.

Although the shape of the cutout portions 502 is a semicircular shape, the cross-sectional shape of each cutout portion 502 may be any other shape, such as a square shape, a rectangular shape, a polygonal shape, or a semi-elliptical shape, as long as the cutout portions 502 and the protruding parts 402 have corresponding shapes and sizes, and the protruding parts 402 can be fitted to the cutout portions 502.

An upper face at a leading end of each protruding part 402 of the first embodiment comes into contact with the sensor substrate 1021 in a predetermined area. However, according to the present variation, the outer circumferential portion of each protruding part 402 simply comes into contact with an end face of an inner wall of the corresponding guide, and it is therefore possible to reduce the contact area between each protruding part 402 and the sensor substrate 1021. Furthermore, the effect of facilitating positioning when the sensor substrate 1021 is attached to the housing 101 via the protruding parts 402 is also achieved.

According to the variations of the present embodiment, the sensor substrate 1021 may be arranged in the housing 101 without using the L-shaped parts 401 of the first embodiment, or the L-shaped parts 401 may also be used.

Second Embodiment

Next, a wearable environmental sensor device 600 according to the second embodiment of the present invention will be described.

Figure 6A:
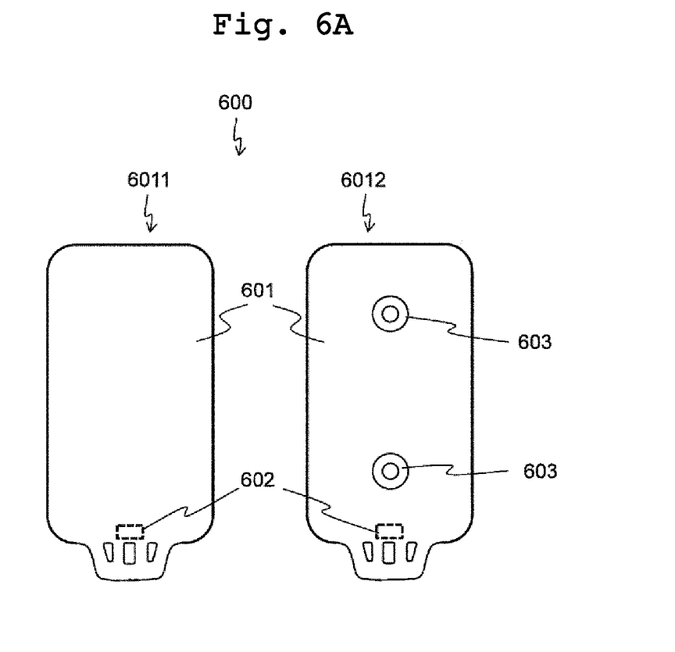
FIG. 6A is an external view of front and back faces of a wearable environmental sensor device according to a variation of a second embodiment of the present invention.

FIG. 6A shows a front face 6011 and a back face 6012 of an environmental sensor device 600 according to the second embodiment of the present invention. The present embodiment has substantially the same configuration as the first embodiment, but is different in that a snap button is provided on the back face 6012 of the housing, and in terms of the configuration of the sensor.

The environmental sensor device 600 is configured to be attached to clothing or a belt using a snap button 603 attached to the back face 6012 of the housing 601.

The snap button 603 also functions as an electrode, and can be electrically connected to an electrode for bioelectric potential measurement that is formed in the clothing or the belt by being fitted to this electrode to measure bioelectric potential such as an electrocardiogram.

The environmental sensor device 600 according to the present embodiment includes a rechargeable battery that is built in as an operating power source (not shown).

Figure 6B:
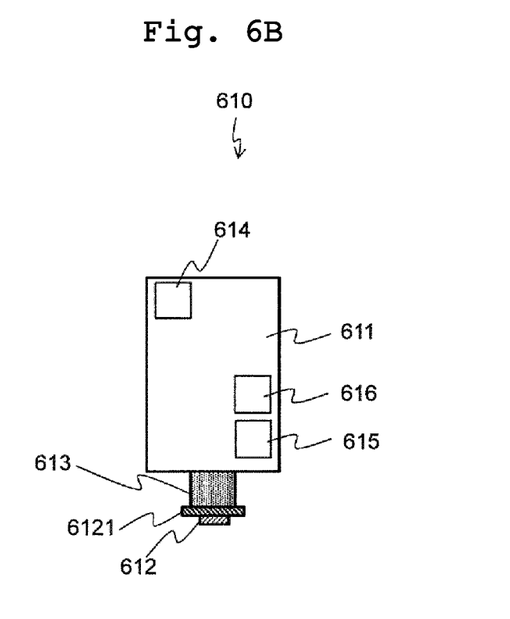
FIG. 6B is a diagram showing a configuration of a mounting substrate of the wearable environmental sensor device according to the second embodiment of the present invention.

FIG. 6B shows a mounting substrate 610 within the housing 601 of the environmental sensor device 600 according to the second embodiment of the present invention. The mounting substrate 610 includes a rigid substrate 611, a temperature and humidity sensor 612, a sensor substrate 6121, a flexible substrate 613, a wireless communication device (wireless communication chip) 614, a CPU (not shown), and a circuit board (not shown). The mounting substrate 610 has substantially the same configuration as the mounting substrate 200 used in the first embodiment of the present invention, but is different in terms of sensors mounted.

The mounting substrate 610 includes an AFE (analog front end) 615 that serves as an electrocardiographic waveform sensor to measure and process waveforms, and an acceleration and angular velocity sensor (gyroscope sensor) 616. Accordingly, biological information can be measured at the same time as the environment (temperature and humidity) at the location where the environmental sensor device 600 is worn. Further, a black-bulb temperature sensor can also be provided.

With the environmental sensor device 600 according to the present embodiment, the same effects as those of the first embodiment are achieved, and the environmental sensor device 600 can be easily attached to clothing or a belt and measure biological information at the same time as the environment (temperature and humidity) of the location where the environmental sensor device 600 is worn.

Although the temperature and humidity sensor is used in the environmental sensor device according to embodiments of the present invention, only a temperature sensor may be used, or only a humidity sensor may be used, and any sensor (hereinafter referred to as an "environmental sensor") may be employed that comes into contact with the environment, such as outside air, to detect information regarding the environment, such as temperature and humidity.

INDUSTRIAL APPLICABILITY

Embodiments of the present invention relate to a wearable environmental sensor device to be worn on a human body or the like, and is applicable to measurement of the environment, such as temperature and humidity, in the vicinity of a human body or the like.

Reference Signs List

| | |
|---|---|
| 100 | Wearable environmental sensor device |
| 101 | Housing |
| 102 | Temperature and humidity sensor |
| 1022 | Sensor surface |
| 103 | Black-bulb temperature sensor |

-continued

Reference Signs List

| | |
|---|---|
| 104 | Sealed section |
| 105 | Protective structure (unsealed section) |
| 106 | Ventilating hole |

The invention claimed is:

1. A wearable environmental sensor device comprising:
a housing comprising a sealed section, a protective structure, and a housing wall which separates the sealed section and the protective structure from each other and which is in contact with an environment;
a sensor substrate;
an environmental sensor mounted on a front face of the sensor substrate; and
an attaching part attaching the sensor substrate to the housing wall,
wherein the protective structure is disposed around the environmental sensor,
the environmental sensor and the sensor substrate are arranged within the protective structure,
the protective structure comprises a plurality of ventilating holes,
the environmental sensor is arranged to face an opening of at least one of the plurality of ventilating holes,
the attaching part contacts only an edge and a portion of a back face of the sensor substrate,
the attaching part comprises an L-shaped part and a protruding part,
the L-shaped part contacts only the edge of the sensor substrate, and
the protruding part contacts only the portion of the back face of the sensor substrate.

2. The wearable environmental sensor device according to claim 1, wherein the environmental sensor comprises a temperature sensor or a humidity sensor.

3. A wearable environmental sensor device comprising:
a housing comprising a sealed section, a protective structure, and a housing wall which separates the sealed section and the protective structure from each other and which is in contact with an environment;
an environmental sensor mounted on a sensor substrate and arranged on the housing wall; and
an attaching part attaching the sensor substrate to the housing wall,
wherein the protective structure is disposed around the environmental sensor,
the protective structure comprises a plurality of ventilating holes,
the environmental sensor is arranged to face an opening of at least one of the plurality of ventilating holes,
the attaching part contacts only an edge and a portion of a back face of the sensor substrate,
the attaching part comprises an L-shaped part and a protruding part;
the L-shaped part contacts only the edge of the sensor substrate; and
the protruding part contacts only the portion of the back face of the sensor substrate.

4. The wearable environmental sensor device according to claim 3, wherein the sensor substrate comprises a guide that contacts the protruding part.

5. The wearable environmental sensor device according to claim 3, further comprising:

a rigid substrate configured to mount an electronic circuit, the rigid substrate being arranged in the sealed section; and a flexible substrate connecting the rigid substrate and the sensor substrate to each other.

6. The wearable environmental sensor device according to claim 5, further comprising:

a wireless communication device arranged on the rigid substrate; and an electrocardiographic waveform sensor or an acceleration and angular velocity sensor arranged on the rigid substrate.

7. The wearable environmental sensor device according to claim 1, further comprising a black-bulb temperature sensor arranged on the sealed section.

8. A method of providing a wearable environmental sensor device, the method comprising:

providing a housing comprising a sealed section, a protective structure, and a housing wall which separates the sealed section and the protective structure from each other and which is in contact with an environment;

mounting an environmental sensor on a front face of a sensor substrate; and attaching the sensor substrate to the housing wall using an attaching part;

wherein the environmental sensor and the sensor substrate are arranged within the protective structure, the protective structure comprises a plurality of ventilating holes, the environmental sensor is arranged to face an opening of at least one of the plurality of ventilating holes, the attaching part contacts only an edge and a portion of a back face of the sensor substrate, the attaching part comprises an L-shaped part and a protruding part, the L-shaped part contacts only the edge of the sensor substrate, and the protruding part contacts only the portion of the back face of the sensor substrate.

9. The method according to claim 8, wherein the environmental sensor comprises a temperature sensor or a humidity sensor.

10. A method of providing a wearable environmental sensor device, the method comprising:

providing a housing comprising a sealed section, a protective structure, and a housing wall which separates the sealed section and the protective structure from each other and which is in contact with an environment;

mounting an environmental sensor on a sensor substrate and on the housing wall; and attaching the sensor substrate to the housing wall using an attaching part, wherein the protective structure is disposed around the environmental sensor, the protective structure comprises a plurality of ventilating holes, the environmental sensor is arranged to face an opening of at least one of the plurality of ventilating holes, the attaching part contacts only an edge and a portion of a back face of the sensor substrate, the attaching part comprises an L-shaped part and a protruding part;

the L-shaped part contacts only the edge of the sensor substrate; and the protruding part contacts only the portion of the back face of the sensor substrate.

11. The method according to claim 10, wherein the sensor substrate comprises a guide that contacts the protruding part.

12. The method according to claim 10, further comprising:

mounting an electronic circuit on a rigid substrate arranged in the sealed section; and connecting the rigid substrate and the sensor substrate to each other using a flexible substrate.

13. The method according to claim 12, further comprising:

arranging a wireless communication device on the rigid substrate; and arranging an electrocardiographic waveform sensor or an acceleration and angular velocity sensor on the rigid substrate.

14. The method according to claim 8, further comprising arranging a black-bulb temperature sensor on the sealed section.

15. The wearable environmental sensor device according to claim 1, further comprising a snap button or a clip provided on the housing.

16. The wearable environmental sensor device according to claim 3, further comprising a snap button or a clip provided on the housing.

17. The method according to claim 8, further comprising providing a snap button or a clip on the housing.

18. The method according to claim 10, further comprising providing a snap button or a clip on the housing.

19. The wearable environmental sensor device according to claim 1, wherein the sealed section is sealed by a packing, welding, or adhesive.

20. The wearable environmental sensor device according to claim 3, wherein the sealed section is sealed by a packing, welding, or adhesive.

21. The method according to claim 8, wherein the sealed section is sealed by a packing, welding, or adhesive.

22. The method according to claim 10, wherein the sealed section is sealed by a packing, welding, or adhesive.

23. The wearable environmental sensor device according to claim 3, wherein the environmental sensor and the sensor substrate are arranged within the protective structure.

24. The method according to claim 10, wherein the environmental sensor and the sensor substrate are arranged within the protective structure.

* * * * *